(12) United States Patent
Sugiyama et al.

(10) Patent No.: US 10,350,845 B2
(45) Date of Patent: Jul. 16, 2019

(54) VENT PIECE AND MANUFACTURING METHOD FOR PNEUMATIC TIRE

(71) Applicant: SUMITOMO RUBBER INDUSTRIES, LTD., Kobe-shi, Hyogo (JP)

(72) Inventors: Naoki Sugiyama, Kobe (JP); Yuichi Nakano, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 195 days.

(21) Appl. No.: 14/902,968

(22) PCT Filed: Sep. 16, 2014

(86) PCT No.: PCT/JP2014/074345
§ 371 (c)(1),
(2) Date: Jan. 5, 2016

(87) PCT Pub. No.: WO2015/049974
PCT Pub. Date: Apr. 9, 2015

(65) Prior Publication Data
US 2016/0151989 A1    Jun. 2, 2016

(30) Foreign Application Priority Data
Oct. 3, 2013    (JP) ................. 2013-207863

(51) Int. Cl.
*B29D 30/06*    (2006.01)
*B29C 33/10*    (2006.01)
*B29L 30/00*    (2006.01)

(52) U.S. Cl.
CPC .......... *B29D 30/0606* (2013.01); *B29C 33/10* (2013.01); *B29D 30/0662* (2013.01); *B29D 2030/0617* (2013.01); *B29L 2030/00* (2013.01)

(58) Field of Classification Search
CPC .. B29D 30/0606; B29D 30/0662; B29C 33/10
See application file for complete search history.

(56) References Cited

U.S. PATENT DOCUMENTS

| | | | |
|---|---|---|---|
| 4,795,331 A | 1/1989 | Cain et al. | |
| 6,454,361 B1 * | 9/2002 | Martin | A63C 17/22 301/37.22 |

(Continued)

FOREIGN PATENT DOCUMENTS

| | | |
|---|---|---|
| GB | 1060334 A | 3/1967 |
| JP | 2873363 B2 | 3/1999 |

(Continued)

OTHER PUBLICATIONS

"Knurls & Knurling", Reed Machinery, Inc, p. 3, accessed at reed-machinery.com on May 7, 2018. (Year: 2018).*
International Search Report, issued in PCT/JP2014/074345, dated Nov. 4, 2014.

(Continued)

*Primary Examiner* — Anthony Calandra
*Assistant Examiner* — Jamel M Nelson
(74) *Attorney, Agent, or Firm* — Birch, Stewart, Kolasch & Birch, LLP

(57) ABSTRACT

Provided are: vent pieces, which can easily be added later and with which the occurrence of spew can be suppressed without restriction in the locations where the vent pieces can be orderly arranged in vulcanized molding of a pneumatic tire; and a manufacturing method for pneumatic tire in which vulcanization molding of a raw cover is performed by using a vulcanization mold in which said vent piece has been embedded. A vent piece, which is used by being embedded in a prepared hole for air vent provided on the inner surface of a pneumatic tire vulcanization mold, is a cylinder without a hole in the axial direction and is configured to perform air vent from a gap formed between the vent piece and the side (Continued)

surface of the prepared hole. A vent piece has a saw cut extending in the axial direction formed on the side surface of the cylinder.

12 Claims, 3 Drawing Sheets

(56) References Cited

U.S. PATENT DOCUMENTS

2009/0061032 A1\* 3/2009 Seroka .................. B29C 33/10
                                                                                                               425/49
2009/0261509 A1 10/2009 Furutani

FOREIGN PATENT DOCUMENTS

| JP | 2003-311742 A | 11/2003 |
|----|---------------|---------|
| JP | 2006-110954 A | 4/2006 |
| JP | 2006-334872 A | 12/2006 |
| JP | 2007-62017 A | 3/2007 |
| JP | 2009-255485 A | 11/2009 |
| JP | 2010-76097 A | 4/2010 |
| JP | 2010-137370 A | 6/2010 |
| WO | WO 2008/136904 A1 | 11/2008 |

OTHER PUBLICATIONS

Written Opinion of the International Searching Authority, issued in PCT/JP2014/074345, dated Nov. 4, 2014.
Chinese Office Action and Search Report issued in Chinese Application No. 201480048669.6, dated Apr. 5, 2017.
Extended European Search Report issued in European Application No. 14850604.1, dated Jan. 26, 2017.

\* cited by examiner

[Fig 1]
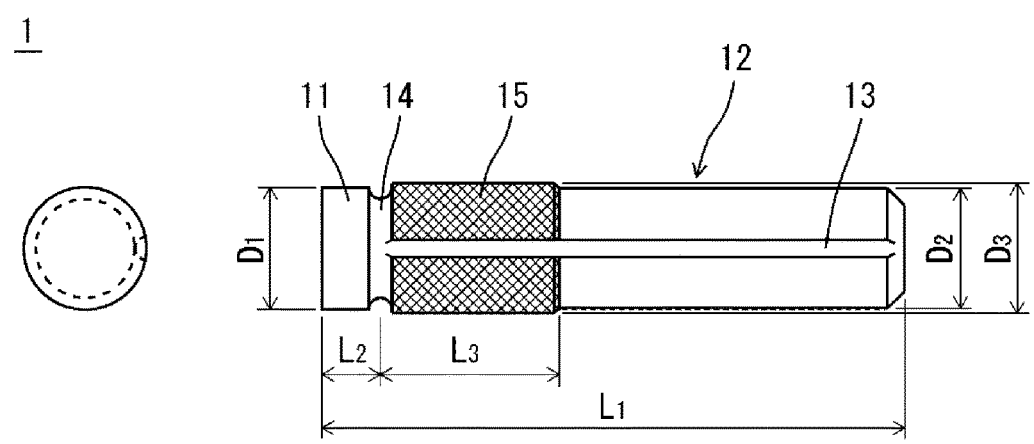
[Fig 2]
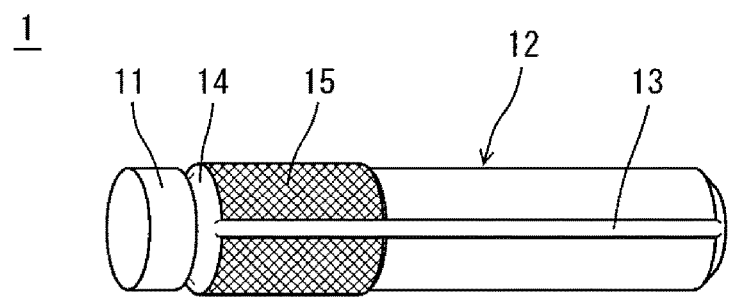

[Fig 3]
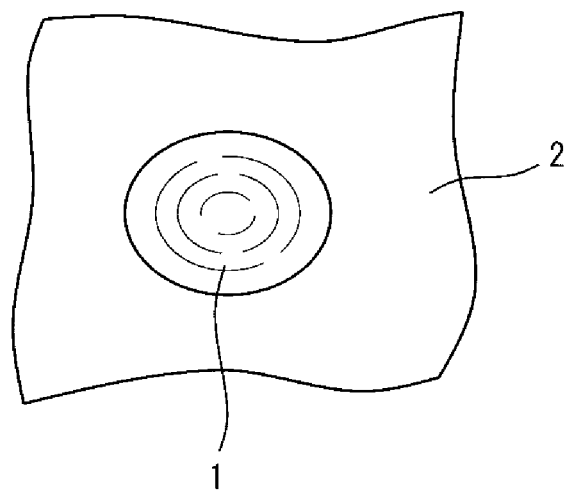
[Fig 4]
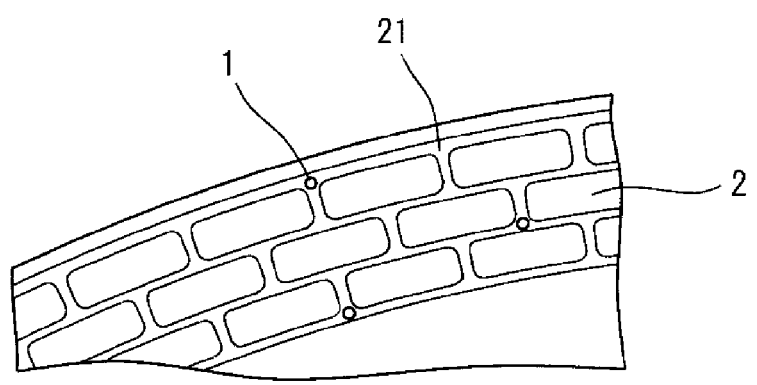

[Fig 5]
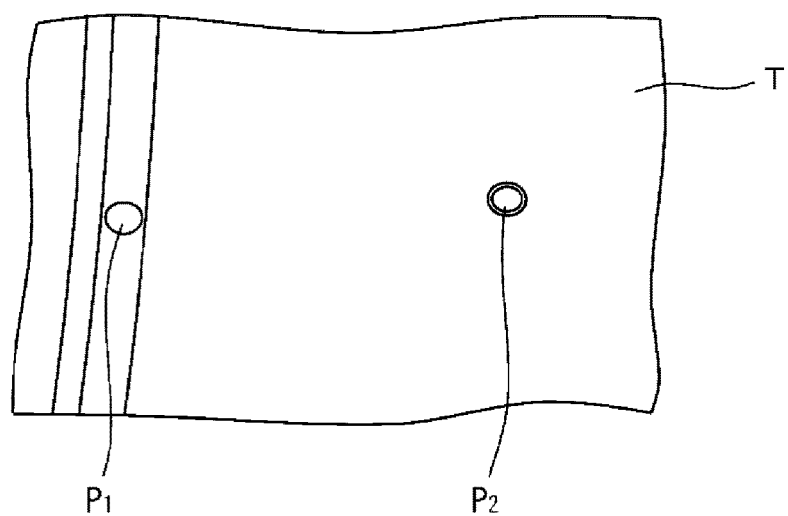
[Fig 6]
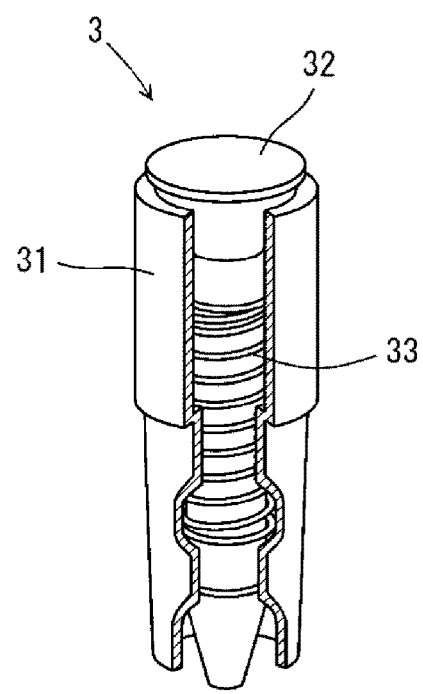

US 10,350,845 B2

VENT PIECE AND MANUFACTURING METHOD FOR PNEUMATIC TIRE

TECHNICAL FIELD

The present invention relates to a vent piece used for performing air vent of a raw cover (an unvulcanized tire) in vulcanization molding of a pneumatic tire; and a manufacturing method for pneumatic tire in which vulcanization molding of a pneumatic tire is performed by embedding the vent piece in a vulcanization mold.

BACKGROUND ART

Vulcanization molding of a pneumatic tire is performed such that: a raw cover is set in a vulcanization mold; then, a bladder arranged on the inner side of the raw cover is expanded so that the outer surface of the raw cover is pressed against the inner face of the vulcanization mold; followed by heating and pressurizing the raw cover at predetermined temperature and pressure for a predetermined time.

In this vulcanization molding, when air remains in the inner face or the surface of the raw cover, this causes degradation in the external appearance quality serving as a product and in the durability of the pneumatic tire. Thus, for example, a method that a vent hole is provided in the vulcanization mold and then air vent is performed (e.g., Patent Document 1) and a method that a vent piece is embedded in a prepared hole formed in the mold and then air vent is performed have widely been employed.

Nevertheless, in these methods, occurrence of spew caused by rubber extruded into the vent hole or the hole of the vent piece cannot be avoided. Among these, the spew caused by the vent hole need be removed in the manufacturing process. Further, as for the spew caused by the vent piece, when the number of occurrences increases, unpreferable external appearance is caused.

As methods for suppressing such occurrence of spew, the method of dividing the mold into a plurality (e.g., Patent Document 2) and the method of employing a spring-shaped vent piece (a spring vent) have been proposed.

PRIOR ART DOCUMENTS

Patent Documents

Patent Document 1: JP2873363B
Patent Document 2: JP2003-311742A

SUMMARY OF THE INVENTION

Problems to be Solved by the Invention

Nevertheless, these methods have the following problems.

That is, in the case of the method of dividing the mold into a plurality, air vent can be performed by releasing air through a gap formed between the mating surfaces of the divided molds. Nevertheless, the portion of air vent is determined in the initial design of the mold and hence cannot be added later. Further, in a case that the mold is divided into an excessively large number, a possibility arises that the mold cannot tolerate the pressurization and hence distortion is caused.

In the case of the method of employing a spring vent, as shown in FIG. 6, air vent can be performed by virtue of the operation of a valve element 32 and a spring 33 attached to a tube-shaped vent piece 31, and such a device can be added even later. Nevertheless, in the spring vent 3, the diameter unavoidably becomes as large as 2.0 to 4.0 mm from a structural reason. This causes restriction in the location for orderly arrangement.

Thus, an object of the present invention is to provide:
a vent piece which can easily be added later in vulcanization molding of a pneumatic tire and is free from restriction in the location for orderly arrangement and in which occurrence of spew can satisfactorily be suppressed; and
a manufacturing method for pneumatic tire in which vulcanization molding of a raw cover is performed by using a vulcanization mold for pneumatic tire in which the vent piece has been embedded.

Means for Solving the Problem

The invention described in claim 1 is
a vent piece used in a manner of being embedded in a prepared hole for air vent provided in an inner face of a vulcanization mold for pneumatic tire, wherein:
the vent piece is composed of a pillar-shaped member not having a hole in an axial direction; and
the vent piece is constructed such that air vent is performed through a gap formed between itself and a side face part of the prepared hole for air vent.
The invention described in claim 2 is
the vent piece according to claim 1, wherein a saw-cut extending in the axial direction is formed in the side face part of the pillar shaped member.
The invention described in claim 3 is
the vent piece according to claim 2, wherein a vent line in a circumferential direction is further formed in the side face part of the pillar-shaped member.
The invention described in claim 4 is
the vent piece according to any one of claims 1 to 3, wherein twill knurl is formed at least in a part of the side face part of the pillar-shaped member.
The invention described in claim 5 is
a manufacturing method for pneumatic tire in which vulcanization molding of a raw cover is performed by using a vulcanization mold for pneumatic tire in which the vent piece according to any one of claims 1 to 4 has been embedded.

Effect of the Invention

According to the present invention, provided are: a vent piece which can easily be added later in vulcanization molding of a pneumatic tire and is free from restriction in the location for orderly arrangement and in which occurrence of spew can satisfactorily be suppressed; and a manufacturing method for pneumatic tire in which vulcanization molding of a raw cover is performed by using a vulcanization mold for pneumatic tire in which the vent piece has been embedded.

BRIEF DESCRIPTION OF DRAWINGS

FIG. 1 is a plan view and a side view of a vent piece according to an embodiment of the present invention.
FIG. 2 is a perspective view of a vent piece according to an embodiment of the present invention.

FIG. 3 is a diagram showing a situation that a vent piece according to an embodiment of the present invention is embedded in a prepared hole of a mold.

FIG. 4 is a diagram showing an example of arrangement locations for vent pieces according to an embodiment of the present invention.

FIG. 5 is a diagram showing an external appearance of a pneumatic tire obtained by vulcanization molding by using a vulcanization mold in which a spring vent of the conventional art and a vent piece according to an embodiment of the present invention are employed together.

FIG. 6 is a diagram showing a structure of a spring vent.

EMBODIMENTS FOR IMPLEMENTING THE INVENTION

The present invention is described below in accordance with an embodiment with reference to the drawings.

1. Vent Piece

FIG. 1 is a plan view and a side view of a vent piece according to an embodiment of the present invention, and FIG. 2 is a perspective view thereof. In FIGS. 1 and 2, numeral 1 indicates a vent piece, numeral 11 indicates a head part thereof, numeral 12 indicates a trunk part thereof, numeral 13 indicates a saw-cut, numeral 14 indicates a vent line, and numeral 15 indicates twill knurl.

As shown in FIGS. 1 and 2, the vent piece 1 is formed as a pillar-shaped member not having a hole in the axial direction and includes the head part 11 and the trunk part 12. The vent piece 1 is used in a manner of being embedded in a prepared hole for air vent provided in the inner face of a vulcanization mold for pneumatic tire. Further, the vent piece 1 is constructed such that air vent is performed through a gap formed between itself and a side face part of the prepared hole for air vent.

As a result, when vulcanization molding of a raw cover is performed by using the vulcanization mold in which the vent piece 1 has been embedded, air is released through the gap for air vent formed between the side face part of the vent piece 1 and the side face part of the prepared hole for air vent. Thus, a pneumatic tire can be obtained in which occurrence of spew is suppressed.

The vent piece 1 according to the present embodiment is constructed from a pillar shaped member having a simple structure. Thus, structural restriction like in the spring vent of the conventional art is not caused and a smaller size can be achieved. Accordingly, in whatever locations, orderly embedment and arrangement can be performed without particular restriction.

As the construction material for the vent piece 1, stainless steel, iron, aluminum, or the like is preferable. Among these, stainless steel is particularly preferable.

As the shape of the vent piece 1, from the perspective of easiness in machining at the time of forming the prepared hole in the vulcanization mold and the like, a cylindrical shape is preferable. Specifically, the vent piece 1 having a cylindrical shape in which the diameter D1 of the head part 11 and the diameter D2 of the trunk part 12 are 1.4 to 2.6 mm and the overall length L1 is 6 to 14 mm is preferable.

Here, as for the gap for air vent formed between the side face part of the vent piece 1 and the side face part of the prepared hole for air vent, it is sufficient that a gap capable of satisfactorily releasing air so as to suppress the occurrence of spew is formed. Thus, with taking this point into consideration, the diameter D1 of the head part 11 and the diameter D2 of the trunk part 12 described above are set up suitably within the range given above.

The shape of the vent piece 1 is not limited to the above-mentioned cylindrical shape and may be a prism shape or another pillar shape.

It is preferable that the saw-cut 13 extending in the axial direction is formed in the side face part of the vent piece 1. When the saw-cut 13 like this is provided, even in the vent piece 1 of the same size, a passage of air is more satisfactorily ensured and hence the air vent function is improved further.

Further, in the vent piece 1, it is more preferable that the vent line 14 extending in the circumferential direction is formed between the head part 11 and trunk parts 12. When the vent line 14 like this is provided, the air having passed through the gap around the head part 11 is led through the vent line 14 to the saw-cut 13. Thus, the passage for air is more satisfactorily ensured and hence the air vent function is improved further.

As the specific shapes of the saw-cut 13 and the vent line 14, grooves of R0.1 mm to R0.4 mm or, alternatively, of similar shapes are preferable.

The formation of the saw-cut or the vent line is not limited to one location and may be performed at a plurality of, that is, two or more, locations. Further, in a case that passage for air is satisfactorily ensured even without the saw-cut or the vent line, the formation is not necessary.

Further, it is preferable that the twill knurl 15 is formed at least in a part of the surface of the side face part of the trunk part 12. The twill knurl 15 is formed in a diameter D3 that is similar to the prepared hole of the vulcanization mold in which the vent piece 1 is embedded and that is larger than the trunk part 12. Then, the twill knurl 15 prevents the vent piece 1 embedded in the vulcanization mold from falling off from the prepared hole. Further, air is satisfactorily released along a gap for air vent formed between the depressions and protrusions of the twill knurl 15 and the side face part of the prepared hole. Thus, the air vent function is improved further.

Here, the length L3 over which the twill knurl 15 is formed and the pitch of the twill are suitably determined with taking into consideration the embedment workability into the prepared hole of the vent piece 1, the property of preventing fall-off from the prepared hole, and the like. Specifically, a pitch of 0.3 to 0.7 mm is preferable.

2. Vulcanization of Pneumatic Tire Employing Vent Piece

Next, vulcanization of a pneumatic tire employing the above-mentioned vent piece is described below. Specifically, the above-mentioned vent piece 1 is embedded into the prepared hole for air vent provided in the inner face of a vulcanization mold 2 for pneumatic tire such that the head part is located on the vulcanization mold surface (FIG. 3). Then, vulcanization molding of a raw cover is performed.

By virtue of this, at the time of vulcanization molding, air can satisfactorily be released through a gap for air vent formed between the side face part of the vent piece and the side face part of the prepared hole for air vent. Thus, a pneumatic tire can be obtained in which air remaining (bear) does not occur and occurrence of spew is also suppressed.

As described above, the size of the vent piece can be reduced in the present embodiment. Thus, at that time, the vent pieces can orderly be arranged and embedded even on a narrow line 21, as shown in FIG. 4, on which spring vents of the conventional art cannot orderly be arranged and embedded.

Here, in the vent piece, air is released through a slight gap formed between itself and the prepared hole. Thus, there is a possibility that the vent piece cannot release a large amount of air per piece in comparison with the spring vent.

However, as described above, the vent piece can easily and orderly be arranged at a location at which the spring vent cannot orderly be arranged. Thus, the number of arrangements can easily be increased so that a satisfactory amount of air can be released in the entirety.

Further, arrangement of the vent piece can be achieved by providing a prepared hole for air vent in the inner face of the vulcanization mold. Thus, when necessary, additional arrangement can be performed later.

FIG. 5 is a diagram showing an external appearance of a pneumatic tire obtained by vulcanization molding by using a vulcanization mold in which a spring vent of the conventional art and a vent piece according to the present embodiment are employed together. Here, in FIG. 5, T indicates a tire obtained by vulcanization molding, P1 indicates a vent mark caused by the vent piece according to the present embodiment, and P2 indicates a vent mark caused by the spring vent of the conventional art.

As shown in FIG. 5, the vent mark P1 caused by the vent piece according to the present embodiment is of a single circle and hence is not very noticeable in the external appearance. In contrast, the vent mark P2 caused by the spring vent is of a double circle and is hence rather noticeable in the external appearance.

EXAMPLE

The present invention is described below in further detail with reference to an implementation example.
1. Fabrication of Tire for Evaluation The vent piece shown in FIG. 1 was embedded in the lower mold of a two-piece mold and then a tire for evaluation of size 215/45R17 SP8090 was fabricated.

Here, the specification of the vent piece shown in FIG. 1 was as follows (the units are all in mm).

D1=D2=ϕ2.0, D3=ϕ2.1
L1=10, L2=1, L3=3
Size of saw-cut 13=(R)0.2×(depth)0.2
Size of vent line 14=(R)0.2
Pitch of twill knurl 15=0.5

Embedment of the vent piece was performed at 24 locations on the circumference of the Maximum Flange Shield (MFS) top and at four locations on the circumference of the side part. Here, the reason why a large number of vent pieces were arranged on the circumference of the MFS top was that in the MFS top, when air vent fails, air remaining (bear) definitely occurs.
2. Evaluation The external appearance was evaluated by visual observation of the fabricated tire for evaluation.

As a result, vent piece marks were hardly noticeable and hence it has been concluded that a pneumatic tire having a remarkably orderly external appearance was obtained. Further, also in the R40 curved surface in the side face, no abnormality has been found that could cause a particular problem.

Although embodiments of the present invention have been explained above, the present invention is not limited to the above-mentioned embodiments. Various changes can be added to the above-mentioned embodiments within the scope of the same as and equivalent to that of the present invention.

DESCRIPTION OF THE REFERENCE SIGNS 1, 31 vent piece
2 vulcanization mold
3 spring vent
11 head part
12 trunk part
13 saw-cut
14 vent line
15 twill knurl
21 narrow line
32 valve element
33 spring
D1 diameter of the head part
D2 diameter of the trunk part
D3 diameter of the twill knurl
L1 overall length
L2 thickness of the head part
L3 length over which the twill knurl is formed
P1, P2 vent mark
T tire

What is claimed is:

1. A vent piece used in a manner of being embedded in a prepared hole for air vent provided in an inner face of a vulcanization mold for a pneumatic tire, wherein:
the vent piece is composed of a pillar-shaped member including a head part, a vent line, a twill knurl, and a trunk part;
wherein the vent line is between the head part and the twill knurl;
wherein the twill knurl is between vent line and the trunk part;
wherein a diameter of the twill knurl is greater than a diameter of the trunk part and said diameter of the twill knurl is greater than a diameter of the head part;
the head part has a cylindrical shape with a smooth side face; and
the vent piece has an air vent through a gap formed between the head part and a side face part of the prepared hole for the air vent.

2. The vent piece according to claim 1, wherein a saw-cut extending in the axial direction is formed in a side face part of the pillar-shaped member.

3. The vent piece according to claim 2, wherein a vent line in a circumferential direction is further formed in the side face part of the pillar-shaped member.

4. The vent piece according to claim 1, wherein the twill knurl has a pitch of 0.3 to 0.7 mm.

5. The vent piece according to claim 1, wherein a twill knurl is formed at least in a part of a side face part of the trunk part, and the twill knurl is formed in a diameter that is similar to the prepared hole for air vent.

6. The vent piece according to claim 5, wherein the twill knurl has diamond knurling.

7. A vulcanization mold for a pneumatic tire, said mold comprising a vent piece embedded in a prepared hole for air vent provided in an inner face of said vulcanization mold, wherein:
the vent piece is composed of a pillar-shaped member including a head part, a vent line, a twill knurl, and a trunk part;
wherein the vent line is between the head part and the twill knurl;
wherein the twill knurl is between vent line and the trunk part;
wherein a diameter of the twill knurl is greater than a diameter of the trunk part and said diameter of the twill knurl is greater than a diameter of the head part;
the head part has a cylindrical shape with a smooth side face; and the vent piece has an air vent through a gap formed between the head part and a side face part of the prepared hole for the air vent.

8. The vulcanization mold according to claim 7, wherein a saw-cut extending in the axial direction is formed in a side face part of the pillar-shaped member of the vent piece.

9. The vulcanization mold according to claim 8, wherein a vent line in a circumferential direction is further formed in the side face part of the pillar-shaped member of the vent piece.

10. The vulcanization mold according to claim 7, wherein a twill knurl having diamond knurling is formed at least in a part of a side face part of the pillar-shaped member of the vent piece.

11. The vulcanization according to claim 10, wherein the twill knurl has a pitch of 0.3 to 0.7 mm.

12. A manufacturing method for pneumatic tire in which vulcanization molding of a raw cover is performed by using a vulcanization mold for pneumatic tire in which the vent piece according to claim 1 has been embedded.

* * * * *